(12) United States Patent
Hsiao et al.

(10) Patent No.: US 8,403,497 B2
(45) Date of Patent: Mar. 26, 2013

(54) PROJECTOR

(75) Inventors: Chi-Hung Hsiao, Taipei County (TW);
Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 253 days.

(21) Appl. No.: 12/849,806

(22) Filed: Aug. 3, 2010

(65) Prior Publication Data

US 2011/0032490 A1 Feb. 10, 2011

(30) Foreign Application Priority Data

Aug. 6, 2009 (TW) ................................ 98126470 A

(51) Int. Cl.
*G03B 21/16* (2006.01)

(52) U.S. Cl. ............... 353/52; 353/57; 353/58; 353/60; 353/61; 353/119; 362/294

(58) Field of Classification Search ............ 353/31, 353/52–61, 119, 122; 349/5, 7, 8, 9, 161; 362/294, 264, 373, 345, 96; 165/121, 80.3, 165/122, 185; 361/695, 697, 710
See application file for complete search history.

(56) References Cited

U.S. PATENT DOCUMENTS

| | | | |
|---|---|---|---|
| 6,290,360 B1 * | 9/2001 | Konuma et al. | 353/61 |
| 6,334,686 B1 * | 1/2002 | Shiraishi et al. | 353/57 |
| 6,443,575 B1 * | 9/2002 | Miyamoto et al. | 353/58 |
| 6,481,854 B1 * | 11/2002 | Sugawara et al. | 353/52 |
| 6,558,003 B2 | 5/2003 | Mihara | |
| 6,758,583 B2 * | 7/2004 | Hsu et al. | 362/373 |
| 6,976,760 B2 * | 12/2005 | Ito et al. | 353/61 |
| 7,210,825 B2 * | 5/2007 | Watanabe et al. | 362/373 |
| 7,405,932 B2 * | 7/2008 | Vinson et al. | 361/695 |
| 7,484,852 B2 * | 2/2009 | Kuraie | 353/57 |
| 7,938,544 B2 * | 5/2011 | Chou et al. | 353/61 |
| 2002/0191159 A1 * | 12/2002 | Nagao et al. | 353/54 |
| 2006/0056181 A1 * | 3/2006 | Wang et al. | 362/294 |
| 2006/0131000 A1 * | 6/2006 | Liu | 165/80.3 |
| 2006/0146293 A1 | 7/2006 | Morimoto et al. | |
| 2006/0256296 A1 * | 11/2006 | Yun et al. | 353/55 |
| 2007/0146645 A1 * | 6/2007 | Lin et al. | 353/58 |
| 2008/0225239 A1 * | 9/2008 | Tan et al. | 353/61 |

* cited by examiner

*Primary Examiner* — Georgia Y Epps
*Assistant Examiner* — Sultan Chowdhury

(57) ABSTRACT

The invention discloses a projector including a casing, an optical module, a light source module, a blowing fan, and an axial fan. The casing has a first air-outlet, a second air-outlet, and an air-inlet. The blowing fan and the axial fan are disposed corresponding to two sides of a light axis of the light source module respectively. When the blowing fan operates, an initial airflow into the casing from the air-inlet flows through the optical module and then a predetermined airflow generated by the blowing fan on a first air-outlet surface of the blowing fan cools the light source module. An angle is formed between the axial fan and one side of the casing. The axial fan directly sends the air around the light source module out of the casing through the first air-outlet and/or the second air-outlet.

19 Claims, 6 Drawing Sheets

PROJECTOR

BACKGROUND OF THE INVENTION

1. Field of the Invention

The present invention relates to a projector, and more particularly, to a projector having excellent heat dissipating performance achieved by the optimal design of fan configuration.

2. Description of the Prior Art

In a general occasion (e.g., a meeting, a film watching, or a show), a projector is usually used to project some data (e.g., a briefing, a video, or an image) on a screen. Currently, the project on the market mainly uses the projection technologies of 3LCD, digital light processing (DLP), or liquid crystal on silicon (LCoS).

Although the color separation and projection theorems of the above-mentioned projection technologies are different, high-voltage halogen lamps or mercury lamps are mostly used as the white light source, and then the white light will be separated into a red (R) light, a green (G) light, and a blue (B) light via a color separation mirror, a panel, or a color wheel.

Please refer to FIG. 1. FIG. 1 shows a scheme diagram of a three-fan projector 9 in the prior art. As shown in FIG. 1, the projector 9 includes a casing 90, a first fan 91, a second fan 92, a third fan 93, an optical module 94, a light source module 95, a circuit module 96, and a clapboard 97. Wherein, the casing 90 has an air-inlet 902 and an air-outlet 904; the optical module 94 has a lens 942. In fact, the light source used in the light source module 95 can be a high-voltage halogen lamp, a high-voltage mercury lamp, or a LED; and the circuit module 96 can be an ordinary circuit board, and there is no specific limitation.

As shown in FIG. 1, after the first fan 91 guides a first initial airflow F1 and a second airflow F2 from the outside of the casing 90 into the casing 90, the first initial airflow F1 will flow toward the second fan 92 along a flowing path formed by the clapboard 97. When the first initial airflow F1 enters into the second fan 92, the second fan 92 will guide a part of the first initial airflow F1 to flow through the inside of the light source module 95 and bring the heat generated by the light source module 95, and then flow out from the light source module 95 to the third fan 93. As to the second airflow F2, after the second airflow F2 enters into the casing 90, the second airflow F2 will pass the circuit module 96 and the light source 95 in order to bring the heat they generate, and then flow toward the third fan 93, too.

Then, since the first initial airflow F1 and the second airflow F2 already absorb a lot of heat and flow toward the third fan 93, therefore, the third fan 93 can be used to guide the first initial airflow F1 and the second airflow F2 to the air-outlet 904, and exhaust the heat out of the casing 90 from the air-outlet 904 to achieve the heat dissipating effect inside the projector 9.

However, as shown in FIG. 1, since the position of the second fan 92 disposed in the casing 90 is designed cooperated with the flowing path formed by the clapboard 97, the entire flowing path of the airflow is not smooth, even a large angle flowing back is occurred around the light source module 95 to cause the heat of the airflow gradually accumulated around the light source module 95 and failed to be removed. These thermal airflows failed to be exhausted will damage the electronic components in the projector 9 and even affect the normal operation of the projector 9.

Therefore, the invention provides a projector to solve the above-mentioned problems occurred in the prior arts.

SUMMARY OF THE INVENTION

An embodiment of the invention is a projector. In this embodiment, the projector includes a casing and an optical module, a light source module, a blowing fan, and a first axial fan disposed in the casing. The casing has a first air-outlet, a second air-outlet, and a first air-inlet; the first air-outlet, the first air-inlet, and the second air-outlet are disposed at a first side, a second side, and a third side of the casing respectively. The optical module is near the second side. The light source module has a light axis. The first axial fan and the blowing fan are disposed corresponding to two sides of the light axis respectively. A first air-outlet surface of the blowing fan faces toward the light source module, wherein when the blowing fan operates, a first initial airflow entering into the casing from the first air-inlet flows through the optical module and then a predetermined airflow generated by the blowing fan on a first air-outlet surface of the blowing fan cools the light source module. An angle is formed between the first axial fan and the first side of the casing. The first axial fan is near the first air-outlet or the second air-outlet, and used to directly send the air around the light source module out of the casing through the air-outlet.

Another embodiment of the invention is also a projector. In this embodiment, the projector includes a casing and an optical module, a light source module, a blowing fan, and a first axial fan disposed in the casing. The casing has a first air-outlet, a second air-outlet, and a first air-inlet. A first air-outlet surface of the blowing fan faces toward the light source module and is corresponding to the first air-outlet or the second air-outlet. Wherein, when the blowing fan operates, a first initial airflow entering into the casing from the first air-inlet flows through the optical module and then a predetermined airflow generated by the blowing fan on a first air-outlet surface of the blowing fan cools the light source module. An angle is formed between the first axial fan and a side of the casing. The first axial fan is near the first air-outlet or the second air-outlet, and used to directly send the air around the light source module out of the casing through the first air-outlet and/or the second air-outlet.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 2:
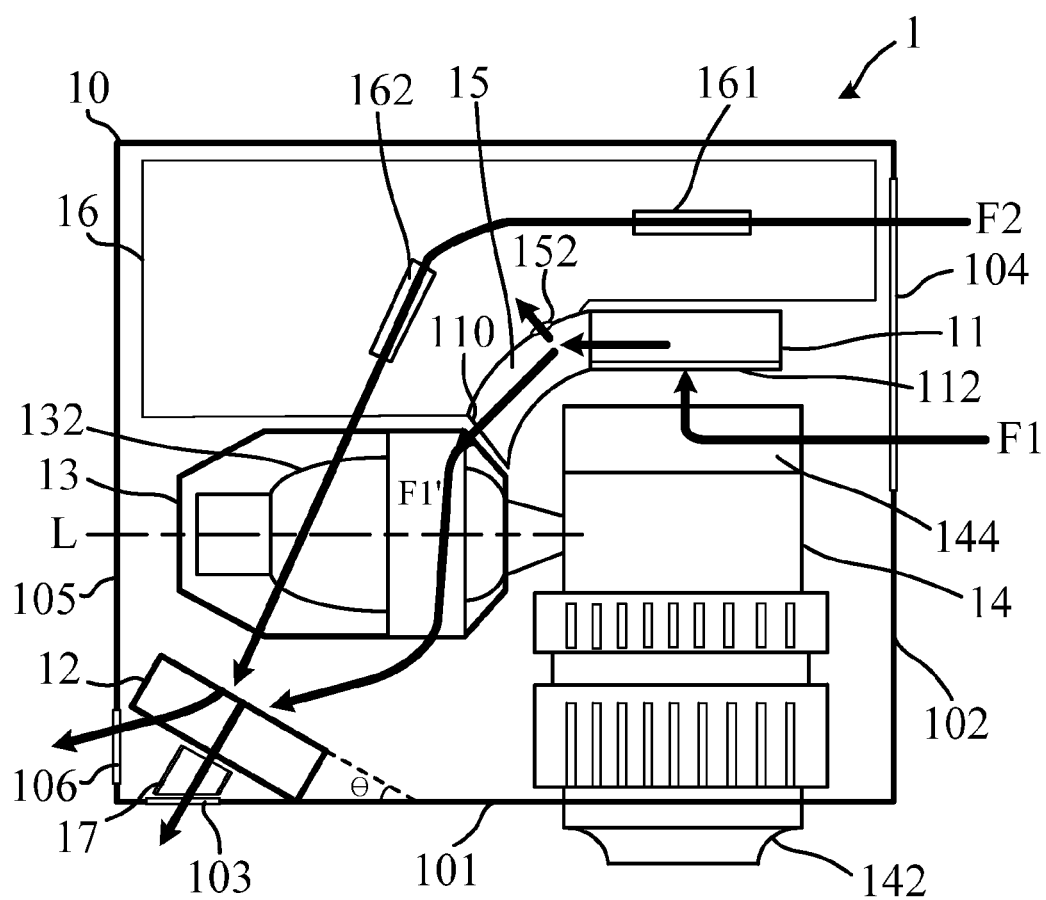
FIG. 2 illustrates a scheme diagram of the projector of the first embodiment of the invention.

A first embodiment of the invention is a projector. The projector of this embodiment has two heat dissipating fans and an air-inlet. Please refer to FIG. 2. FIG. 2 shows a scheme diagram of the projector of the first embodiment of the invention. As shown in FIG. 2, the projector 1 includes a casing 10, a blowing fan 11, a first axial fan 12, a light source module 13, an optical module 14, a circuit module 16, and a rib 17.

A first air-outlet 103, an air-inlet 104, and a second air-outlet 106 are disposed at a first side 101, a second side 102, and a third side 105 of the casing 10 respectively. Wherein, the second side 102 and the third side 105 are adjacent to the first side 101 respectively; the second side 102 is opposite the third side 105; the light source module 13 has a light axis L, the blowing fan 11 is disposed one side of the light axis L and the first axial fan 12 is disposed another side of the light axis L; a first air-outlet surface 110 of the blowing fan 11 faces toward the light source module 13 and is disposed corresponding to the direction of the first air-outlet 103; the first axial fan 12 is near the first air-outlet 103 and the second air-outlet 106, and the first axial fan 12 is used to directly sends the air around the light source module 13 out of the casing 10 through the first air-outlet 103 and/or the second air-outlet 106. It should noticed that the number, the positions and the size of air-outlets and air-inlets can be adjusted based on practical needs, and not limited to this case.

It should be noticed that the first axial fan 12 is disposed near the first air-outlet 103 or the second air-outlet and an angle θ is formed between the first axial fan 12 and the first side 101 of the casing 10. The angle θ is used for prevent from thermal distortion phenomenon resulted from the light projecting by the lens 142 being affected by the heat exhausted from the first air-outlet 103. Preferably, in this embodiment of two heat dissipating fans, the angle θ is larger than 36° to effectively prevent the thermal distortion phenomenon.

In this embodiment, a light source 132 of the light source 13 includes, but not limited to, a high-voltage halogen lamp, a high-voltage mercury lamp, a LED, etc. The optical module 14 includes a lens 142 and an optical engine 144, wherein the lens 142 extends out of the first side 101 of the casing 10; the optical engine 144 includes several sets of polarization, light separation, and light filtering devices used for processing the lights emitted from the light source module 13 to generate a projected frame. For example, the optical engine 144 may include a transmission LCD panel, a reflection digital optical processor, a digital micro-mirror device (DMD), a silicon substrate LCD device, a polarization beam splitters (PBS), a band pass filter (BPF), and a UV-IR filter, it depends on the practical needs.

In practical applications, there may be more than one thermal source in the projector 1. In this embodiment, the light source module 13 and the optical engine 144 will be the thermal sources in the projector 1 to explain the practical operation of the projector 1 in this invention.

When the projector operates, a first initial airflow F1 and a second airflow F2 is generated from the air-inlet 104. The first initial airflow F1 will flow through the optical engine 144 (the second thermal source) and brings a part of heat, and then flow toward an air-inlet surface 112 of the blowing fan 11. When the first initial airflow F1 flows into the blowing fan 11 from the air-inlet surface 112, the blowing fan 11 will generate a first predetermined airflow F1' flowing out from the first air-outlet surface 110 to dissipate the heat generated by the light source module 13.

Figure 1:
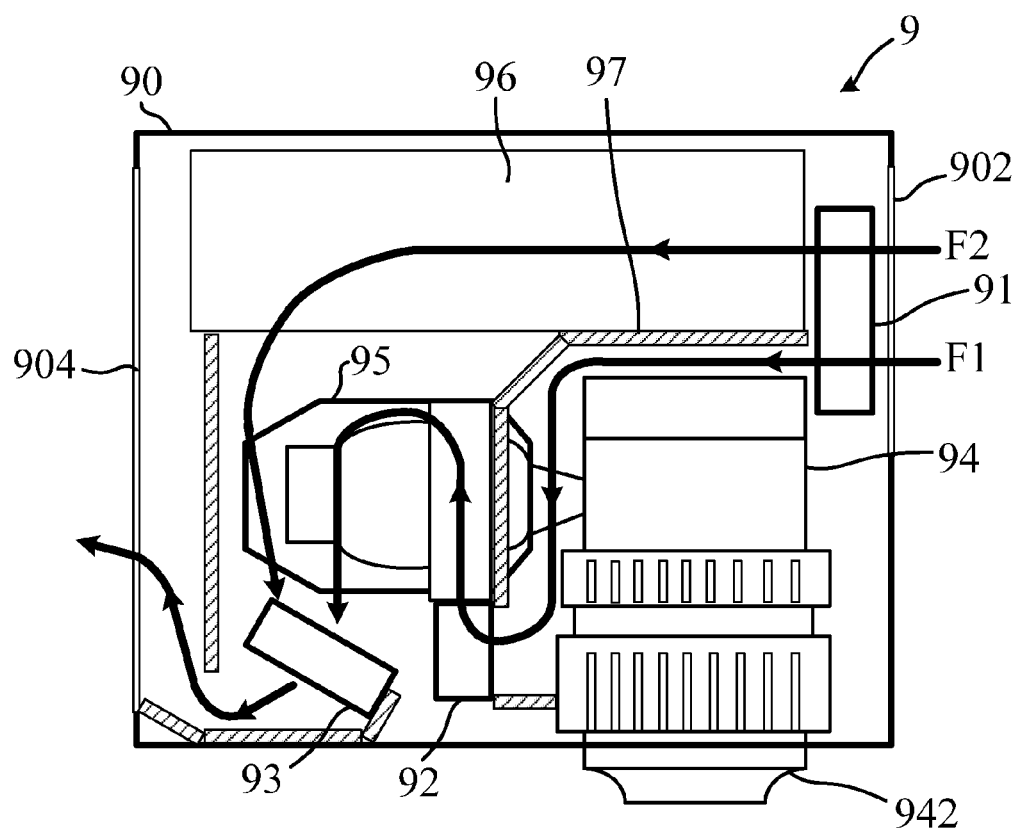
FIG. 1 illustrates a scheme diagram of a three-fan projector in the prior art.

It should be noticed that since the blowing fan 11 further includes a airflow guiding device 15, therefore, the first air-outlet surface 110 of the airflow guiding device 15 can help guiding the first predetermined airflow F1' toward the light source module 13 smoothly. Furthermore, the blowing fan 11 facing the light source generates airflow F1' for cooling the light source, and then airflow F1' is driven to flow out of the light source module 13 directly, but, in the prior art (please refer to FIG. 1), the airflow after cooling the light source still flows in the light source module because of the unsmooth flowing path of airflow F1.

In fact, the airflow guiding device 15 can be an object similar to a nozzle, and holes 152 can be disposed on the airflow guiding device 15. The shape of the airflow guiding device 15 and the number of the holes 152 can be determine based on practical needs and have no specific limitations. In addition, the blowing fan 11 can further include a second air-outlet surface, so that the directions of the airflows flowing out from the first air-outlet surface 110 and the second air-outlet surface will be different to cool different regions in the casing 10.

Then, after the first predetermined airflow F1' flows the inside of the light source module 13 and brings the heat generated by the light source of the light source module 13, the first predetermined airflow F1' will flow out of the light source module 13 and flow toward the first axial fan 12. The second airflow F2 will flow along a first direction for a predetermined distance and pass through a first heat dissipating unit 161 of the circuit module 16, then the second airflow F2 will turn to a second direction and pass a second heat dissipating unit 162. Afterward, the second airflow F2 will flow through the light source module 13 and bring the heat generated by the light source module 13, and then the second airflow F2 will also flow toward the first axial fan 12.

It should be noticed that the positions and directions the first heat dissipating unit 161 and the second heat dissipating unit 162 disposed on the circuit module 16 are designed to cooperate with the flowing path of the second airflow F2 on the circuit module 16. Specifically, the length direction of the first heat dissipating unit 161 is on the path of the second airflow F2 and disposed along the first direction; the length direction of the second heat dissipating unit 162 is on the path of the second airflow F2 and disposed along the second direction. In order to achieve the preferred heat dissipating effect, the first heat dissipating unit 161 and the second heat dissipating unit 162 on the circuit module 16 are parallel to the second airflow F2, but not limited to this case. In fact, there is no limitation to the number and the type of the heat dissipating unit disposed on the circuit module 16.

Figure 3:
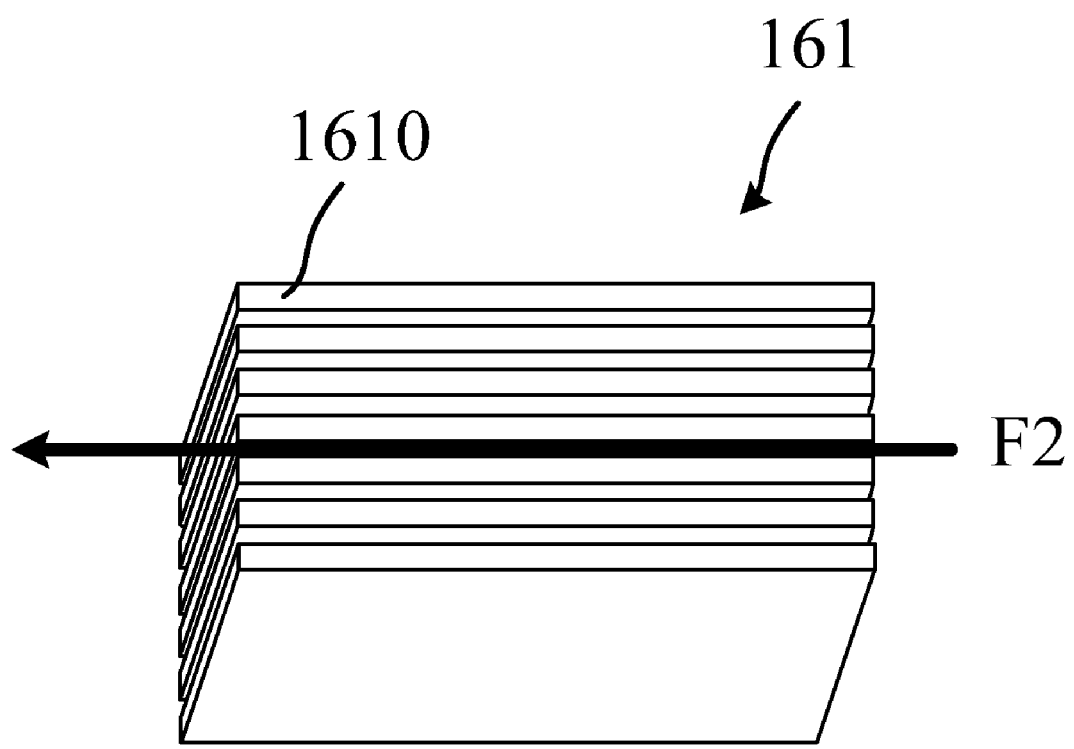
FIG. 3 illustrates a scheme diagram of the second airflow passing the plurality of heat dissipating fins of the first het dissipating unit.

Moreover, as shown in FIG. 3, the first heat dissipating unit 161 can include a plurality of heat dissipating fins 1610, and the plurality of heat dissipating fins 1610 are arranged parallel to the second airflow F2, so that the second airflow F2 can smoothly pass the first heat dissipating unit 161. Also, the second heat dissipating unit 162 is similar to that of the first heat dissipating unit 161; it is not described again here.

Then, as described above, the first predetermined airflow F1' and the second airflow F2 absorbing a lot of heat will finally flow into the first axial fan 12, therefore, the first axial fan 12 will be used to guide the first predetermined airflow F1' and the second airflow F2 to the first air-outlet 103 and/or the second air-outlet 106, and directly send the heat out of the casing 10 through the first air-outlet 103 and/or the second air-outlet 106 to achieve heat dissipation.

Further, a rib 17 can be disposed between the first axial fan 12 and the first air-outlet 103 (or the second air-outlet 106). The main function of the rib 17 is to guide the flowing direction of the thermal airflow exhausted by the first axial fan 112 through the first air-outlet 103, so that the thermal airflow can be as far as possible away from the lens 142 extended from the first side 101 to prevent the thermal distortion phenomenon caused by the thermal airflow randomly flowing in front of the lens 142. In fact, there is no limitation to the size and the material of the rib 17, they are determined according to the practical needs.

In second embodiment, the projector of this embodiment has three heat dissipating fans and an air-inlet. Please referring to FIG. 4, the projector 2 includes a casing 20, a blowing fan 21, a first axial fan 22, a light source module 23, an optical module 24, a airflow guiding device 25, a circuit module 26, a rib 27, and a second axial fan 28. A first air-outlet 203, an air-inlet 204, and a second air-outlet 206 of the projector 2 are disposed at a first side 201, a second side 3 202, and a third side 205 of the casing 20 respectively.

Figure 4:
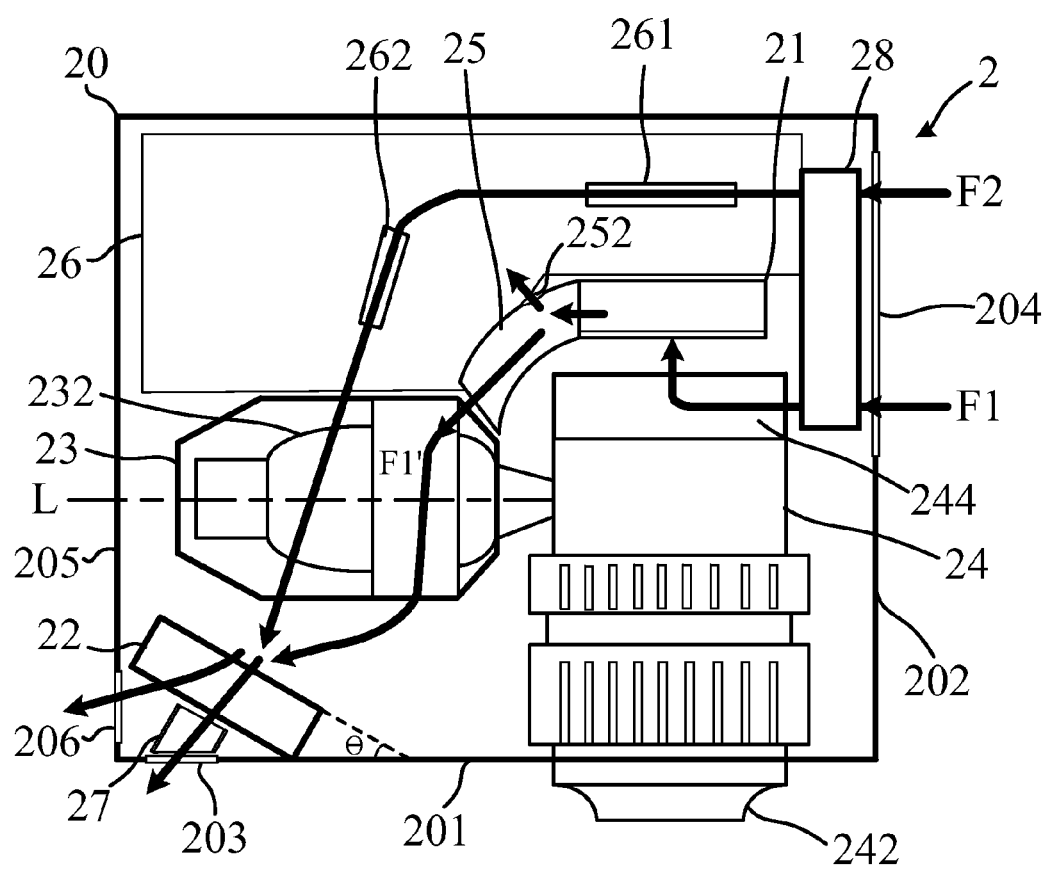
FIG. 4 illustrates a scheme diagram of the projector of the second embodiment of the invention.

Comparing FIG. 2 with FIG. 4, it can be found that the difference between first and second embodiment is the second axial fan 28. In this embodiment, the second axial fan 28 is disposed near the air-inlet 204, and used to guide a first initial airflow F1 and a second airflow F2 from the outside of the casing 20 into the casing 20 via the air-inlet 204. In fact, the second axial fan 28 can cool the circuit module 26 and the optical module 24 at the same time, but not limited to this case.

In addition, the length direction of the first heat dissipating unit 261 of the circuit module 26 is on the path of the second airflow F2 and disposed along the first direction; the length direction of the second heat dissipating unit 262 is on the path of the second airflow F2 and disposed along the second direction. That is to say, the first heat dissipating unit 261 and the second heat dissipating unit 262 are parallel to the second airflow F2. It should be noticed that since the projector 2 of this embodiment has three heat dissipating fans. Therefore, the angle θ is larger than 20° to effectively prevent the thermal distortion phenomenon occurred on the lens 242. As to the other modules of the projector 2 and their functions, it can be referred to the above-mentioned first embodiment.

Figure 5:
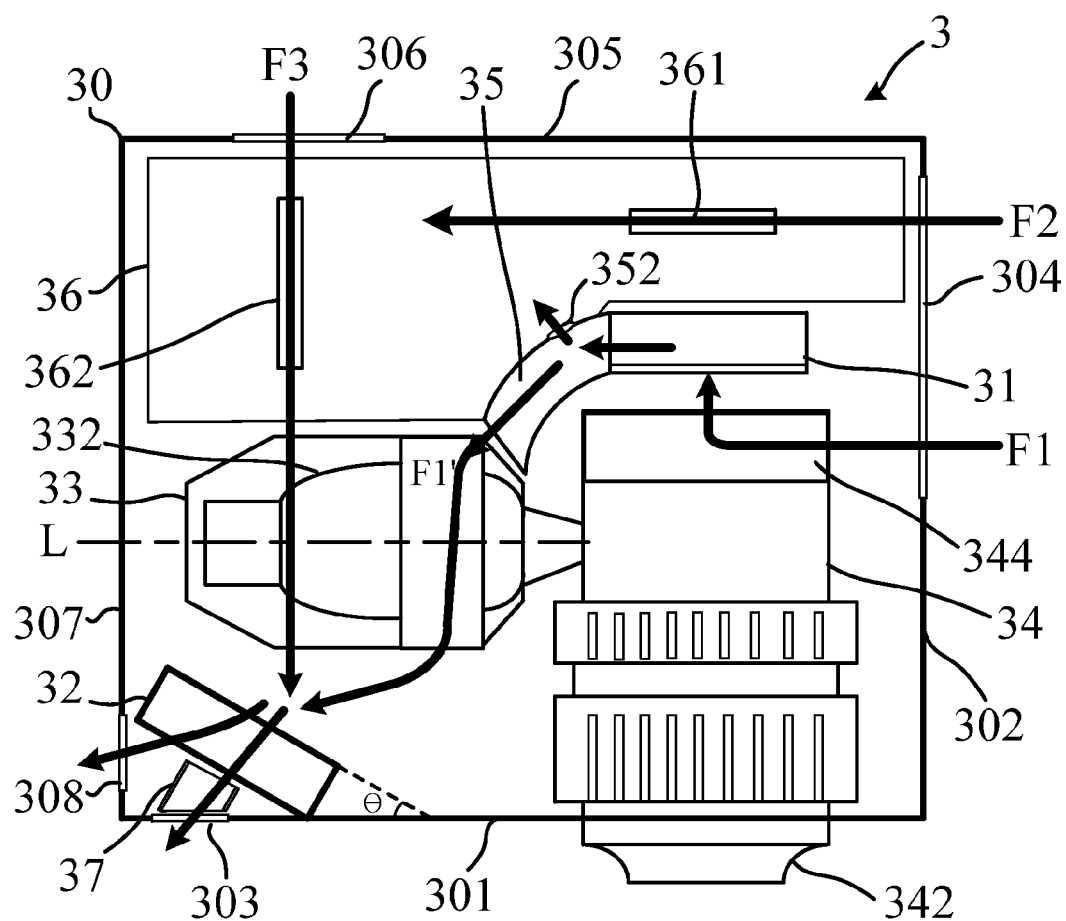
FIG. 5 illustrates a scheme diagram of the projector of the third embodiment of the invention.

In third embodiment, the projector of this embodiment has two heat dissipating fans and two air-inlets. Please referring to FIG. 5, the projector 3 includes a casing 30, a blowing fan 31, a first axial fan 32, a light source module 33, an optical module 34, an airflow guiding device 35, a circuit module 36, and a rib 37.

In this embodiment, a first air-outlet 303 and a second air-outlet 308 of the projector 3 are disposed at a first side 301 and a third side 307 of the casing 30 respectively; a first air-inlet 304 and a second air-inlet 306 of the projector 3 are disposed at a second side 302 and a fourth side 305 of the casing 30 respectively. A first initial airflow F1 and a second airflow F2 enters into the casing 30 through the first air-inlet 304; a third airflow F3 enters into the casing 30 through the second air-inlet 306. Wherein, the fourth side 305 is opposite to the first side 301, and the third side 307 is opposite to the second side 302.

In addition, the length direction of the first heat dissipating unit 361 of the circuit module 26 is on the path of the second airflow F2 and disposed along the first direction; the length direction of the second heat dissipating unit 362 is on the path of the third airflow F3 and disposed along the second direction. That is to say, the first heat dissipating unit 361 is disposed parallel to the flowing path of the second airflow F2; but the second heat dissipating unit 362 is disposed parallel to the flowing path of the third airflow F3. Specifically, the length direction of the first heat dissipating unit 361 is substantially perpendicular to the length direction of second heat dissipating unit 362 on the circuit module 36, but not limited to this case.

In this embodiment, t Since the projector 3 of this embodiment has two heat dissipating fans, the angle θ is larger than 36° to effectively prevent the thermal distortion phenomenon.

As to the other modules of the projector 3 and their functions, it can be referred to the above-mentioned first embodiment.

Figure 6:
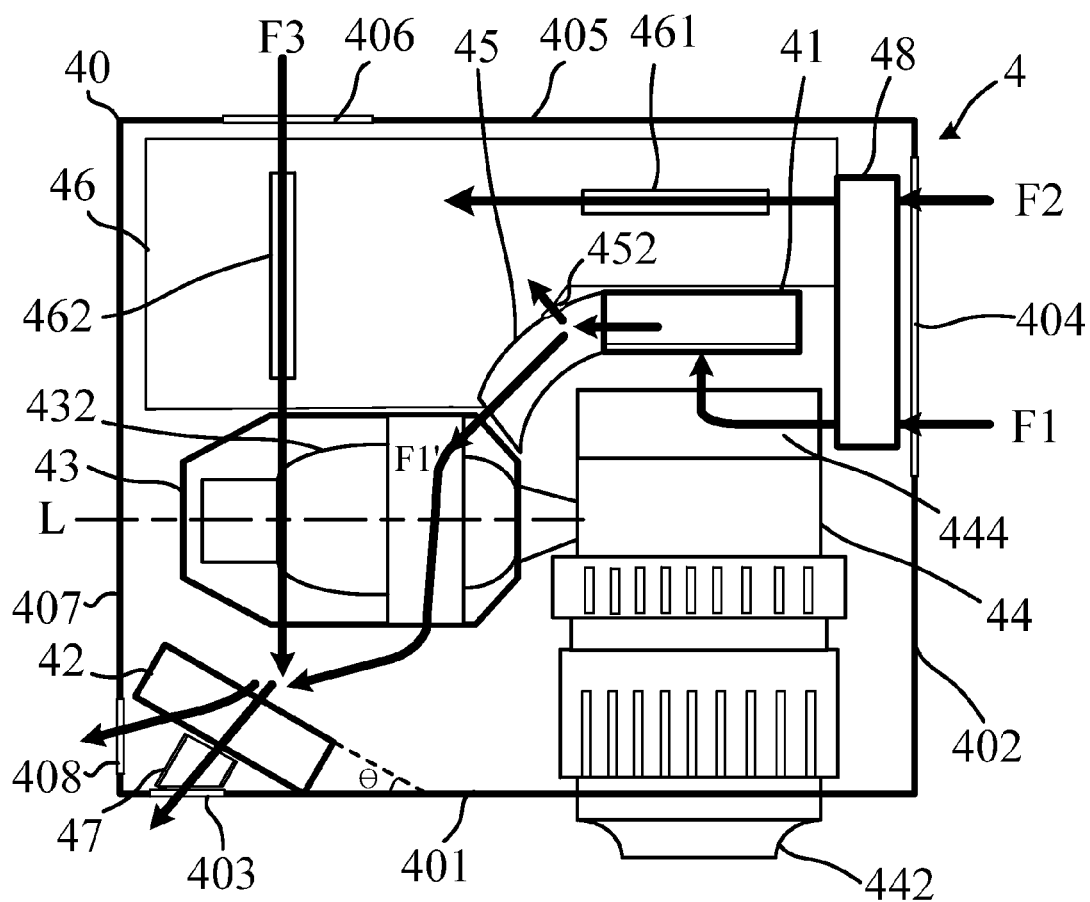
FIG. 6 illustrates a scheme diagram of the projector of the fourth embodiment of the invention.

In fourth embodiment, the projector of this embodiment has three heat dissipating fans and two air-inlets. Please referring to FIG. 6, the projector 4 includes a casing 40, a blowing fan 41, a first axial fan 42, a light source module 43, an optical module 44, an airflow guiding device 45, a circuit module 46, a rib 47, and a second axial fan 48.

In this embodiment, a first air-outlet 403 and a second air-outlet 408 of the projector 4 are disposed at a first side 401 and a third side 407 of the casing 40 respectively; a first air-inlet 404 and a second air-inlet 406 of the projector 4 are disposed at a second side 402 and a fourth side 405 of the casing 40 respectively. A first initial airflow F1 and a second airflow F2 enters into the casing 40 through the first air-inlet 404; a third airflow F3 enters into the casing 40 through the second air-inlet 406. Wherein, the fourth side 405 is opposite to the first side 401, and the third side 407 is opposite to the second side 402.

The second axial fan 48 of the projector 4 is disposed near the first air-inlet 404 and used to generate the first initial airflow F1 and the second airflow F2 from the outside environment into the casing 40 via the first air-inlet 404. It should be noticed that the second axial fan 48 can dissipate the heat from the circuit module 46 and the optical module 44 at the same time, but not limited to this case, and the angle θ is larger than 20° to effectively prevent the thermal distortion phenomenon occurred on the lens 442.

In addition, the length direction of the first heat dissipating unit 461 of the circuit module 46 is on the path of the second airflow F2 and disposed along the first direction; the length direction of the second heat dissipating unit 462 is on the path of the third airflow F3 and disposed along the second direction. That is to say, the first heat dissipating unit 461 is disposed parallel to the flowing path of the second airflow F2; but the second heat dissipating unit 462 is disposed parallel to the flowing path of the third airflow F3. Specifically, the length direction of the first heat dissipating unit 461 is substantially perpendicular to the length direction of second heat dissipating unit 462 on the circuit module 36, but not limited to this case.

Compared to the prior arts and the projector of the invention, the positions of the fans in the casing are appropriately designed. Therefore, not only the temperature rising phenomenon caused by the gradually accumulated heat near the light source because the thermal airflow flows around the light source can be improved, but also the thermal distortion phenomenon resulted from the light projecting by the lens of the projector being affected by the heat exhausted from the air-outlet. In addition, the circuit board of the projected in this invention has heat dissipating units disposed in the same direction with the airflow and the fan facing to the light source has a plurality of air-outlet surfaces, which provides preferred heat dissipating effect inside the projector.

Although the present invention has been illustrated and described with reference to the preferred embodiment thereof, it should be understood that it is in no way limited to the details of such embodiment but is capable of numerous modifications within the scope of the appended claims.

What is claimed is:

1. A projector, comprising:
   a casing, having a first air-outlet, a second air-outlet and a first air-inlet, the first air-outlet, the first air-inlet and the second air-outlet being disposed at a first side, a second side and a third side of the casing respectively;
   an optical module, disposed in the casing and near the second side;

a light source module, disposed in the casing and having a light axis;

a blowing fan, disposed in the casing, a first air-outlet surface of the blowing fan facing to the light source module, wherein when the blowing fan operates, a first initial airflow entering into the casing from the first air-inlet flows through the optical module and then an airflow generated by the blowing fan on a first air-outlet surface of the blowing fan cools the light source module; and a first axial fan, disposed in the casing and an angle being formed between the first axial fan and the first side of the casing;

wherein the first axial fan and the blowing fan are disposed corresponding to two sides of the light axis respectively, the first axial fan is near an air-outlet and used to directly send the air around the light source module out of the casing through the air-outlet, and the air-outlet is selected from a group formed by the first air-outlet and the second air-outlet.

2. The projector of claim 1, wherein the blowing fan further comprises a second air-outlet surface, so that directions of the airs flowing out from the first air-outlet surface and the second air-outlet surface are different.

3. The projector of claim 1, wherein the first air-outlet surface is disposed corresponding to the first side.

4. The projector of claim 1, wherein the light source module further comprises a light source, the blowing fan is used to dissipate the heat of the light source.

5. The projector of claim 1, further comprising:
a second axial fan, disposed in the casing and near the first air-inlet; and
a circuit module, having a first heat dissipating unit and a second heat dissipating unit;
wherein a second airflow generated by the second axial fan flows a distance along a first direction and then turns to a second direction, a length direction of the first heat dissipating unit is on the flowing path of the second airflow and disposed along the first direction, a length direction of the second heat dissipating unit is on the flowing path of the second airflow and disposed along the second direction.

6. The projector of claim 1, wherein the casing further comprises a second air-inlet disposed at a fourth side, the fourth side is opposite the first side, the projector further comprises:
a second axial fan, disposed in the casing and near the first air-inlet; and
a circuit module, having a first heat dissipating unit and a second heat dissipating unit;
wherein a second airflow generated by the second axial fan flows along a first direction, a third airflow is generated between the first axial fan and the second air-inlet flows along a second direction, a length direction of the first heat dissipating unit is on the flowing path of the second airflow and disposed along the first direction, a length direction of the second heat dissipating unit is on the flowing path of the third airflow and disposed along the second direction.

7. The projector of claim 6, wherein the second side is adjacent to the first side, the optical module has a lens disposed at the first side, the second axial fan generates the first initial airflow and the second airflow at the same time to cool the optical module and the circuit module respectively.

8. The projector of claim 1, wherein the casing further comprises a second air-inlet disposed at a fourth side, the fourth side is disposed corresponding to the first side, the projector further comprises:
a circuit module, having a first heat dissipating unit and a second heat dissipating unit, a length direction of the first heat dissipating unit is disposed corresponding to the first air-inlet and along a first direction, a length direction of the second heat dissipating unit is disposed corresponding to the second air-inlet and along a second direction.

9. The projector of claim 1, wherein the second side is adjacent to the first side, the optical module has a lens disposed at the first side, the projector further comprises:
a rib, disposed between the first axial fan and the first air-outlet for guiding the direction of the airflow sent out from the first axial fan.

10. A projector, comprising:
a casing, having a first air-outlet, a second air-outlet, and a first air-inlet;
an optical module, disposed in the casing;
a light source module;
a blowing fan, disposed in the casing, a first air-outlet surface of the blowing fan facing to the light source module and corresponding to the first air-outlet or the second air-outlet; and
a first axial fan, disposed in the casing and an angle being formed between the first axial fan and a side of the casing;
wherein the first axial fan is near an air-outlet and an air-outlet surface of the first axial fan faces to the air-outlet, the first axial fan is used to send the air around the light source module out of the casing through the air-outlet, and the air-outlet is selected from a group formed by the first air-outlet and the second air-outlet, directions of the airs flowing out from the blowing fan and the first axial fan are substantially the same.

11. The projector of claim 10, wherein the blowing fan further comprises a second air-outlet surface, so that directions of the airs flowing out from the first air-outlet surface and the second air-outlet surface are different.

12. The projector of claim 10, wherein the light source module further comprises a light source, the blowing fan is used to dissipate the heat of the light source.

13. The projector of claim 10, further comprising:
a second axial fan, disposed in the casing and near the first air-inlet; and
a circuit module, having a first heat dissipating unit and a second heat dissipating unit;
wherein a second airflow generated by the second axial fan flows a distance along a first direction and then turns to a second direction, a length direction of the first heat dissipating unit is on the flowing path of the second airflow and disposed along the first direction, a length direction of the second heat dissipating unit is on the flowing path of the second airflow and disposed along the second direction.

14. The projector of claim 10, wherein the casing further comprises a second air-inlet, the projector further comprises:
a second axial fan, disposed in the casing and near the first air-inlet; and
a circuit module, having a first heat dissipating unit and a second heat dissipating unit;
wherein a second airflow generated by the second axial fan flows along a first direction, a third airflow is generated between the first axial fan and the second air-inlet flows along a second direction, a length direction of the first heat dissipating unit is on the flowing path of the second airflow and disposed along the first direction, a length direction of the second heat dissipating unit is on the flowing path of the third airflow and disposed along the second direction.

15. The projector of claim 14, wherein the first air-outlet is corresponding to the second air-inlet, the second axial fan generates a first initial airflow and the second airflow at the same time to cool the optical module and the circuit module respectively.

16. The projector of claim 10, wherein the casing further comprises a second air-inlet, the projector further comprises:
   a circuit module, having a first heat dissipating unit and a second heat dissipating unit, a length direction of the first heat dissipating unit is disposed corresponding to the first air-inlet and along a first direction, a length direction of the second heat dissipating unit is disposed corresponding to the second air-inlet and along a second direction.

17. The projector of claim 10, wherein the optical module has a lens, the lens and the first air-outlet are disposed at the same side of the casing, the projector further comprises:
   a rib, disposed between the first axial fan and the first air-outlet, for guiding the direction of the airflow sent out from the first axial fan.

18. The projector of claim 10, wherein the optical module has a light axis, the first axial fan and the blowing fan are disposed corresponding to two sides of the light axis respectively.

19. The projector of claim 10, wherein when the blowing fan operates, a first initial airflow entering into the casing from the first air-inlet flows through the optical module and then an airflow generated by the blowing fan on the first air-outlet surface of the blowing fan cools the light source module.

* * * * *